Figure 1:
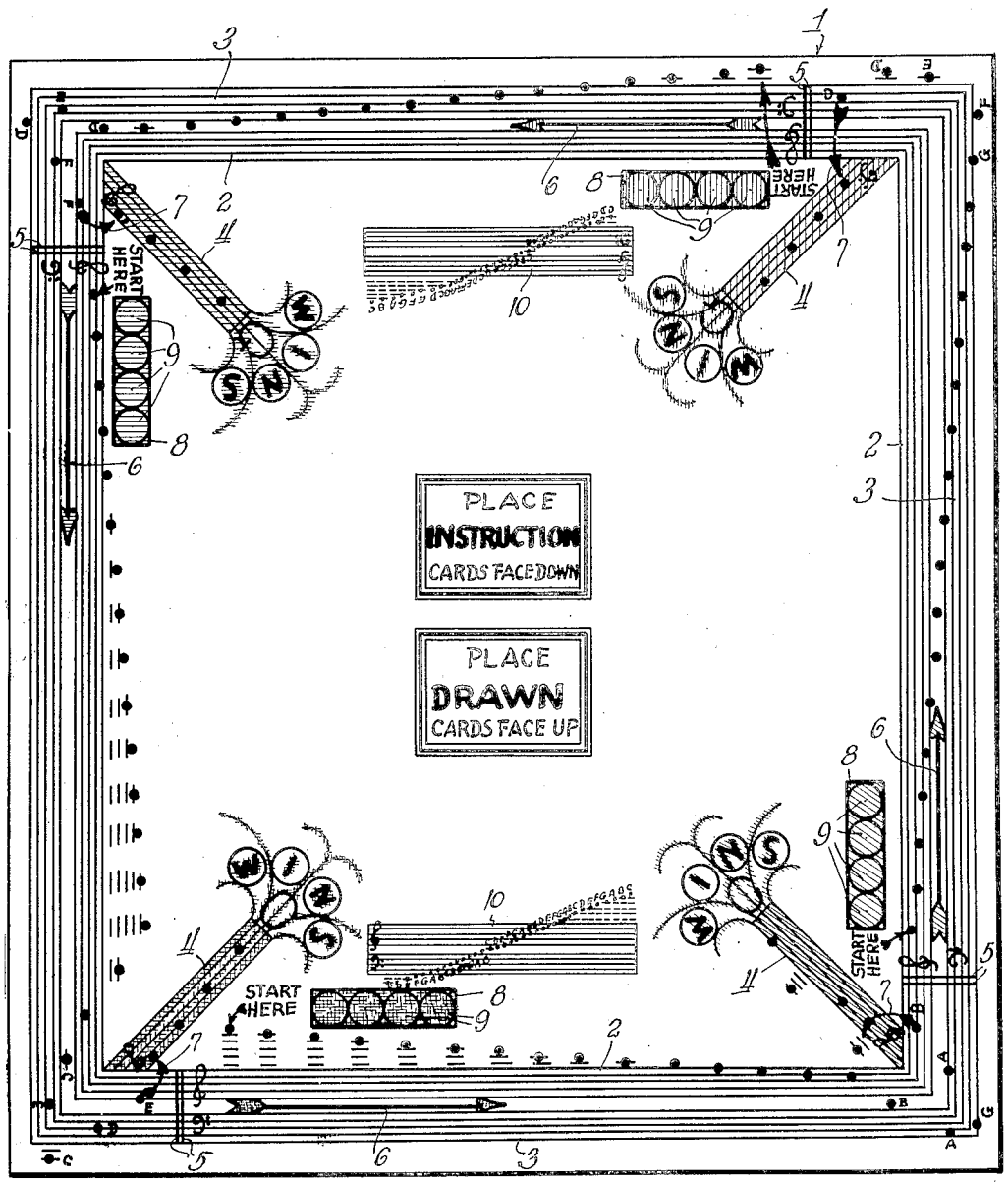
Figure 2:
Figure 3:
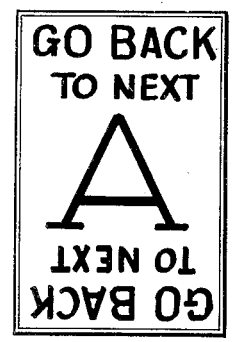

July 13, 1937.  C. GERBER  2,086,864
GAME
Filed Nov. 1, 1935  2 Sheets-Sheet 1

Inventor:
Charles Gerber.
By Brown, Jackson, Boettcher & Dienner.
Attys

July 13, 1937.  C. GERBER  2,086,864

GAME

Filed Nov. 1, 1935  2 Sheets-Sheet 2

Inventor:
Charles Gerber.
By Brown, Jackson, Boettcher & Dienner,
Attys

Patented July 13, 1937

2,086,864

UNITED STATES PATENT OFFICE 2,086,864

GAME

Charles Gerber, Madison, Wis.

Application November 1, 1935, Serial No. 47,805

3 Claims. (Cl. 273—134)

This invention relates to games, and has to do with a game for teaching the notes of the musical scale.

Many musicians, even those of considerable experience, frequently have difficulty in sight reading of music and it is often necessary for them to play a selection a number of times before they can be assured of rendering it with accuracy. This is due largely to the fact that many musicians are not sufficiently familiar with the positions of the notes of the musical scale to be able to recognize instantly a given note from its position, which is essential in sight reading. This is, of course, even more true of beginners or persons inexperienced in reading music.

The primary object of my invention is to provide a game which is enjoyable and at the same time is instructive and of value in teaching the positions of the various notes of the scale without conscious effort on the part of the player. A further object is to provide a game of the character stated, the playing of which is simple and requires no extensive musical knowledge on the part of the players. Further objects and advantages of my invention will appear from the detail description.

In the drawings:—

Figure 1 is a plan view of a game board embodying my invention;

Figures 2 to 5, inclusive, are face views of certain of the cards used in playing the game.

In the game embodying my invention, I provide a suitable board having tracks with the positions of the notes of the musical scale marked thereon. This board, designated 1 in its entirety, is preferably of rectangular shape, as shown, and is provided with two marginal tracks comprising the treble staff 2 and bass staff 3, respectively. The position of the different notes of the scale are marked on these tracks in proper relation to the respective staffs. A "wins" or home staff 4 extends diagonally inward from each corner of the inner track 2 and these home staffs, including the lines, notes and associated features are of different colors, conveniently red, blue, yellow and green. A letter is placed adjacent the inner end of the respective home staffs, this letter corresponding to a note of the scale, and the word "wins" appears beyond this letter with the letters of this word arranged in an arc about the note letter and each enclosed in a circle. Arcuate lines extend from the lines of the home staff to the circles enclosing the letters of the word "wins" and are colored correspondingly to the lines of the staff, the note letter at the inner end of this staff and the letters of the word "wins" also being colored correspondingly to the adjacent home staff. The latter staff also has thereon notes of the musical scale, as shown. None of the notes has any particular value assigned thereto, since the function thereof is to give the position of the note relative to its associated staff.

The tracks are further provided with a stop mark, conveniently in the form of two parallel bars 5 adjacent and in advance of each of the home staffs 4. The player starts at the first note to the right of the stop mark. Arrow 6 disposed between the tracks, is of the same color as the adjacent home staff and indicates the direction meant by "forward". This starting note is indicated by the words "start here" and the arrow associated therewith, and this note is colored correspondingly to the associated "wins" or home staff. The arrow 7 indicates the path the player must follow in entering his home staff.

There may be four players and the board is provided, adjacent each of the home staffs, with a rectangular strip or frame 8 of the same color as the home staff. This frame accommodates four discs or game pieces 9 colored correspondingly to the frame 8, it being understood that there are four sets of game pieces, those of each set being colored correspondingly to one of the home staffs 4.

The letters of the notes appearing on the major portions of the tracks are not given, but at the corners, and other locations where the regular sequence of the notes is interrupted, they may be lettered. The board is provided, however, adjacent opposite sides thereof, with two scales 10 giving names or letters of notes and the proper positions thereof relative to the treble and bass staffs. By reference to these scales, the players can determine any note on either track.

Figure 4:
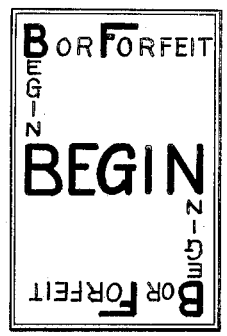
Figure 5:
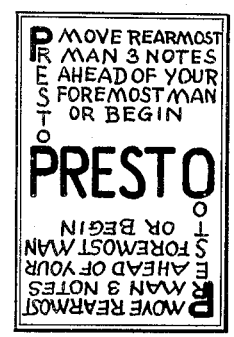

The plays are determined by instruction cards. Preferably, I provide fifty-four of these cards, certain of which are marked "begin", others being marked "presto", and the remainder being marked with the letters of the notes of the scale and instructions as to the manner of movement. In starting the game, the player who first plays may be determined in any suitable manner, as by rolling dice, flipping a coin or otherwise. The pack of cards is placed face down in the space indicated at the central portion of the board. The cards are then drawn by the players in turn, and are turned face up in the space indicated at the center portion of the board, the player moving his game piece in accordance with the instructions of the card which he turns up. In order for a player to start it is necessary for him to turn up a card marked "begin" or a card marked "presto." If a player turns up a card marked "begin" and all of the pieces of that player are in play, he forfeits his move and the next succeeding player then turns up a card. If a player turns up a card marked "presto", he has his choice of placing any man or game piece of his own on the first starting note adjacent his "wins" staff, indicated by the legend "start here" and associated arrow, provided he has a game piece which has not been put into play, or of moving his rearmost man three notes ahead of his foremost one. Figures 4 and 5 are face views of the "begin" and "presto" cards, respectively. The men or game pieces are moved along the tracks in accordance with the instructions of the cards turned up. In example, assume that a player turns up the card shown in Figure 2, he moves his game piece forward to the next A on the proper track or his home staff. If this player has more than one game piece in play, he may move any piece he desires, which lends additional interest to the game as requiring judgment on the part of the player. On the other hand, if the player turns up the card shown in Figure 3, he is required to move his game piece back to the next A and, in this case also, if the player has more than one game piece in play, he may move any one of such pieces in accordance with the instructions of the card. It will be understood, of course, that all of the notes of the scale are represented by the cards of the pack, and each note may be repeated a number of times. When all of the cards of the pack have been turned up, the pack is again placed face down in the space indicated and the drawing of the cards proceeds as before.

Each of the stop marks 5 is colored correspondingly to the adjacent home staff and is the stop sign for the game pieces of that color only. The game pieces of any one color may move forward across the stop marks of any other color, but not forward across the stop mark of the same color. But the game pieces of any one color may be moved rearward across the stop mark of any color, including their own color. If, in any case, the player cannot make the play indicated by the card which he turns up, he forfeits his play. In order for the player to move his game piece into the "wins" station, it is necessary for him to turn up a card bearing the note letter appearing at the inner end of his home staff. He then moves his game piece onto this letter and thence into one of the circles enclosing the letters of the word "wins." If the player is using four men or game pieces, the first one to enter the home station is placed upon the letter W, the next one upon the letter I, and so on until the four letters of the word have thus been covered. The first player to accomplish this wins the game.

The board shown is intended to accommodate four players, each player being provided with four game pieces or men. It will be understood, however, that the game may be played by two or more players, up to four, and each player may have one or more game pieces, preferably not to exceed four in number. It is preferred that beginners use the four game pieces in the play, but play under a temporary rule to the effect that the first player to get one game piece in his "wins" station shall be the winner of the game. As the players become more familiar with the game, the rule should require that two game pieces be gotten into a player's "wins" station in order to win the game, then three, and finally four.

At first, the players will refer frequently to the scales 10, but after they are familiar with the notes and their positions, this becomes unnecessary. In this manner the players are taught the notes of the scale without conscious effort and are able to recognize instantaneously the note appearing in a musical selection. In this manner, the players are effectively trained and quickly become proficient in sight reading of musical selections, which is an important object of my invention. It will be understood that variations may be resorted to without departing from the field and scope of my invention, and I intend to include all such variations, as fall within the scope of the appended claims, in this application in which the preferred form only of my invention is disclosed.

What I claim is:—

1. In a game apparatus of the character described, a rectangular game board having two adjacent continuous marginal tracks comprising the treble and bass staffs, respectively, of the musical scale with the positions of the notes of the scale marked thereon, with home staffs extending from the corners of one of said tracks and stop marks extending across both tracks in advance of the respective home staffs.

2. In a game apparatus of the character described, a game board having two continuous marginal tracks of rectangular outline comprising the treble and base staffs, respectively, of the musical scale with the positions of the different notes of the scale marked thereon, with home staffs extending diagonally inward from the corners of the inner one of said tracks and having positions of different notes of the scale marked thereon, said tracks having stop marks thereon adjacent and in advance of the respective home staffs.

3. In a game apparatus of the character described, a game board having two continuous tracks comprising the treble and base staffs, respectively, of the musical scale with the positions of the different notes of the scale marked thereon, said tracks having home stations operatively associated therewith and being provided with stops adjacent said stations.

CHARLES GERBER.